(12) United States Patent
Mardones Soto et al.

(10) Patent No.: US 11,033,038 B2
(45) Date of Patent: Jun. 15, 2021

(54) ATMOSPHERE CONTROL DEVICE, REQUIRING MINIMUM INTERVENTION FOR INSTALLATION IN REFRIGERATED CONTAINERS, SAID DEVICE BEING A STANDALONE, COMPACT AND REUSABLE DEVICE COMPRISING A LONG CYLINDRICAL BODY, A BATTERY AREA, AN ELECTRONICS AREA, A HANDLING AREA, A COVER AREA, AND A GAS EXCHANGE AREA

(71) Applicant: Liventus Chile S.A., Santiago (CL)

(72) Inventors: Claudia Alejandra Mardones Soto, Calera de Tango (CL); Francisco Javier Valenzuela Rollán, Tipaume Rengo (CL); Mariano Pola Matte, Santiago (CL)

(73) Assignee: Liventus S.A., Santiago (CL)

( * ) Notice: Subject to any disclaimer, the term of this patent is extended or adjusted under 35 U.S.C. 154(b) by 188 days.

(21) Appl. No.: 16/094,558

(22) PCT Filed: Jul. 18, 2016

(86) PCT No.: PCT/CL2016/000037
§ 371 (c)(1),
(2) Date: Oct. 18, 2018

(87) PCT Pub. No.: WO2017/181298
PCT Pub. Date: Oct. 26, 2017

(65) Prior Publication Data
US 2019/0098910 A1 Apr. 4, 2019

(30) Foreign Application Priority Data

Apr. 20, 2016 (CL) ..................................... 948-2016

(51) Int. Cl.
*A23B 7/148* (2006.01)
*A23L 3/3418* (2006.01)
(Continued)

(52) U.S. Cl.
CPC ................ *A23B 7/148* (2013.01); *A23B 7/04* (2013.01); *A23B 7/152* (2013.01); *A23L 3/001* (2013.01);
(Continued)

(58) Field of Classification Search
CPC ........ B65D 81/18; B65D 81/20; B65D 81/28; B65D 81/263; A23B 7/152; A23B 7/148
(Continued)

(56) References Cited

U.S. PATENT DOCUMENTS 5,872,721 A * 2/1999 Huston .................. A23B 7/148
62/150
6,520,071 B1 * 2/2003 Lanza ................... B65B 31/047
141/198

(Continued)

*Primary Examiner* — Reginald Alexander
(74) *Attorney, Agent, or Firm* — Chambliss, Bahner & Stophel, P.C.

(57) ABSTRACT

Atmospheric control valve device, part of an atmospheric control system built into a refrigerated container, whose installation requires minimal intervention and is self-sufficient, compact and reusable due to its long, cylindrical body that includes a battery compartment. The body also has a compartment for the electrical, electronic and sensor elements; a handling compartment for the elements that handle the device; a cover area to cover the container after removing the device; and a gas exchange compartment for two-way gas exchanges, controlled by a solenoid valve and by the differences in pressure that occur naturally within the refrigerated container.

20 Claims, 9 Drawing Sheets

(51) Int. Cl.
*A23B 7/04* (2006.01)
*B65D 88/74* (2006.01)
*A23B 7/152* (2006.01)
*B65D 81/20* (2006.01)
*B65D 81/28* (2006.01)
*A23L 3/00* (2006.01)
*A23L 3/36* (2006.01)
*F25D 11/00* (2006.01)
*B65D 81/26* (2006.01)

(52) U.S. Cl.
CPC .............. *A23L 3/3418* (2013.01); *A23L 3/36* (2013.01); *B65D 81/20* (2013.01); *B65D 81/28* (2013.01); *B65D 88/74* (2013.01); *F25D 11/003* (2013.01); *A23V 2002/00* (2013.01); *B65D 81/263* (2013.01)

(58) Field of Classification Search
USPC .......................... 99/467, 468, 470, 472, 473
See application file for complete search history.

(56) References Cited

U.S. PATENT DOCUMENTS

| | | | |
|---|---|---|---|
| 7,937,914 B2* | 5/2011 | Savicki | B65B 31/047 53/510 |
| 2018/0020687 A1* | 1/2018 | Yokohara | A23L 3/3427 96/117 |
| 2018/0220665 A1* | 8/2018 | Savur | A23B 7/152 |

* cited by examiner

ESTADO DEL ARTE

ATMOSPHERE CONTROL DEVICE, REQUIRING MINIMUM INTERVENTION FOR INSTALLATION IN REFRIGERATED CONTAINERS, SAID DEVICE BEING A STANDALONE, COMPACT AND REUSABLE DEVICE COMPRISING A LONG CYLINDRICAL BODY, A BATTERY AREA, AN ELECTRONICS AREA, A HANDLING AREA, A COVER AREA, AND A GAS EXCHANGE AREA

SCOPE OF THE INVENTION

The present invention falls within the scope of atmospheric control systems that use air flow controllers or valves for refrigerated containers in the transport of cargo.

BACKGROUND OF THE INVENTION

The transportation of fresh products from one destination to another, such as fruit, fish, seafood, among others, is a common practice in the food industry, requiring means to ensure that fresh food is kept under the best possible conditions during its transportation between destinations. Some fresh foods continue to ripen during transport. A good example of this type of product are fruit and vegetables, as they keep breathing even after harvesting, which means that they consume oxygen and produce carbon dioxide. On the other hand, the fruit itself produces phytohormones that, if left unchecked, can accelerate ripening if their concentration in the transport packaging reach high enough levels.

Fresh food products normally suffer some sort of spoilage after harvesting, as they continue to generate a metabolic gaseous exchange (both through photo-breathing and through the production of phytohormones). However, such spoilage can be controlled during transport, by using cargo containers equipped with the necessary elements to control gas exchange, thus avoiding spoilage and the early ripening of the transported product. Such containers are well-known and commonly used today.

Two main approaches are used to keep the fruit in good condition. The first focuses on keeping the fruit at low temperatures in order to reduce its cellular metabolism, ultimately decreasing its gas exchange rate. The second approach is the control and/or external decrease of oxygen (replacing it with nitrogen, carbon dioxide or another inert gas), which also results in a decrease in cellular respiration, increasing the levels of carbon dioxide generated from the fruit or introduced externally, in order to achieve two objectives at the same time: a) biological control, restricting the growth of aerobic bacteria, preventing fruit spoilage, and b) control of the release of ethylene, to prevent early fruit ripening.

The types of containers normally used to transport fresh products are refrigerated containers with comprehensive refrigeration systems, such as fully refrigerated containers. The latter generally include an area for the cargo and a refrigeration system. In turn, the refrigeration system contains refrigeration modules, service hatches, ventilation hatches and fans within the area where the refrigeration module is placed (to vent air into the container where the cargo is stored), and an air inflow/outtake, such as those mentioned in patents ES 2143858, ES 2036180 and/or WO2015178537, among others.

To control all the parameters related to the spoilage and ripening of the fruit transported in the refrigerated containers, these containers need to be modified with a series of components to control the atmosphere within them. There are several atmosphere control systems available, such as the gas production system, the gas injection and air exchange system, the air exchange-only system, and ozone production systems; they all require adding elements to maintain a controlled atmosphere.

Controlled atmosphere containers must be airtight, to separate the controlled atmosphere from the outside environment. The various devices used to control the atmosphere in a refrigerated container generally require permanent manipulation within the container, and holes must be drilled into the walls to install the atmosphere control elements.

Controlled atmosphere systems, mounted within a refrigerated container as described in the prior art, generally involve an atmosphere controller, a gas intake hose for the controller, a power cable from the controller to another place in the front wall of the refrigerated area, a data cable from the controller to another place in the front wall of the refrigerated area, a gas injection port mounted on the front wall of the refrigeration system within the refrigerated area, and a cable from the controller to the inside of the container, connected to a gas scrubber within the container. The controller gauges the oxygen and carbon dioxide levels in the atmosphere and responds by injecting nitrogen and/or carbon dioxide as necessary, depending on the fruit's oxygen consumption and its carbon dioxide production, whereby an excess or lack of gas (oxygen and carbon dioxide) prompts the controller to open or close the hatches that regulate their levels within the atmosphere. If the controller detects an excess of carbon dioxide, it turns on the scrubber to absorb it. These systems also require an outside power source to operate the abovementioned devices.

A technical issue related to the aforementioned technology is that, while it is true that a controlled atmosphere system does keep the transported fruit in good conditions, it is also true that its operation requires modifying the container and installing several parts, making it hard to implement and maintain.

It would therefore be helpful to have an atmosphere control system that required the least possible amount of interventions in the container, minimizing its implementation in the refrigerated container to transform it into a controlled atmosphere container.

Another technical problem that the present development can address is the ability to regulate the atmosphere inside a container automatically and autonomously through a small device with its own built-in energy source, using its own sensors capable of accurately detecting the exchange of gases throughout the container, and that can be controlled directly and/or wirelessly.

With this development we also hope to develop a device that is reusable and easily transported.

One last technical problem to resolve is having a high mechanical performance of the equipment (continuous and constant control of the device) with a very low power consumption. This is achieved by using the pressures that the refrigeration system naturally generates inside the container (negative and positive pressures) to mechanically support the atmospheric control device.

Document U.S. Pat. No. 8,562,399 in the prior art also describes a vent valve with two valve openings in a plate-type valve, where the opening level is controlled by means of a valve element that rotates on the valve plate. This is provided alongside at least one valve opening in an air duct, whose cross-section can be adjusted with a valve controller motor, so that the ventilation valve setup can be opened widely.

On the other hand, U.S. Pat. No. 5,801,317 (also in the prior art) describes a controller, used in a system that uses selective permeable membrane technology to maintain a controlled atmosphere within a refrigerated container. This controller is electrically interlinked to a carbon dioxide and oxygen sensor placed within the container, to measure oxygen and carbon dioxide levels.

Also, there are more complex developments such as the one in U.S. Pat. No. 5,872,721 (FIG. 9/9) of February 1999, which introduces a valve for atmospheric control with a moving tab featuring a series of holes to control air intake and outflow. The number of moving parts and servo-motors used to control this device make it very complex and highly energy-intensive (which is why it requires an external power source). Furthermore, integrating the device into a refrigerated container requires greater handling, which imposes a significant drain in time, money and trained human resources.

The solutions in the prior art, although they do involve intervening the container in which they are to be installed, require a series of additional elements and pieces to operate optimally. Even with their shape and setup, they cannot combine in a single, reusable, compact and self-sufficient element the greatest possible number of functions and elements required when implementing an atmosphere control system within a refrigerated container.

Therefore, there is a need to provide a valve device or an atmosphere controller device to implement a controlled atmosphere system in a refrigerated container whose setup reduces interventions on the container body, is autonomous, compact and can be reused in a way that minimizes implementation, operation and maintenance costs.

INVENTION ABSTRACT

The first objective of the present development is to provide an atmospheric control valve device, whose shape and structural setup allows for the refrigerated containers to be intervened as little as possible during installation, in order to transform them into refrigerated containers with controlled atmosphere for the transport of perishable cargo.

The second objective of the present development is to provide an atmospheric control valve device that combines the largest number of elements of a controlled atmosphere system in a single piece (compact), to be implemented in a refrigerated container.

The third objective of the present development is to provide an atmospheric control valve device whose setup reduces energy consumption.

The fourth objective of the present development is to provide an atmospheric control valve whose low energy consumption allows the device to be autonomous, thanks to its own electrical power source.

Finally, the fifth objective of the present development is to provide an atmospheric control valve device with the ability to be reused in its port of origin or destination as required.

The present invention features an atmospheric control valve device that is part of an atmospheric control system for a refrigerated cargo container, used to transport perishable cargo. The valve device's body is long and cylindrical. It includes two-way gas exchange media controlled by a solenoid valve and by the natural pressure differences produced within the refrigerated container, thereby reducing its energy consumption. The invention also includes an internal battery inside the body for its operation. The body includes all the electrical, electronic and sensor elements, which results in a compact, self-sufficient, reusable, energy-saving atmospheric control valve device. Moreover, the intervention required to transform a refrigerated container into a refrigerated container with controlled atmosphere is minimal.

It should be noted that the use of the singular, here and throughout the entire text, does not exclude the plural, unless the context clearly implies it. So, for example, the reference to a "means" is a reference to one or more means and includes equivalent forms known to those who know about the subject matter (art). Similarly, as another example, the reference to "one step", "one stage" or "one mode" is a reference to one or more steps, stages or modes and may include implicit and/or overlapping sub-steps, stages or modes.

All the conjunctions used are to be understood in the least restrictive and most inclusive sense possible. Thus, for example, the conjunction 'or' must be understood in its orthodox logical sense, and not as an 'or excluding', unless the context or text expressly requires or indicates it. The structures, materials and/or elements described herein are to be understood as also referring to those being functionally equivalent in order to avoid endless and exhaustive lists.

Expressions used to indicate approximations or conceptualizations should be understood as such, unless the context calls for a different interpretation.

All the names and technical and/or scientific terms used herein shall bear the common meaning given to them by a common person, qualified in these matters, unless expressly indicated otherwise.

The methods, techniques, devices, systems, equipment and materials are described although methods, techniques, devices, systems, equipment and materials similar and/or equivalent to those described may be used or preferred in the application and/or testing of the present invention.

The devices described herein must also be construed as referring to any similar or functionally equivalent structure.

All patents and other publications were previously incorporated as references for the purpose of describing and/or informing, for example, the methodologies described in such publications, which may be useful in relation to the present development. These publications are included only for their information prior to the registration date of this patent application.

In general, the term "reduce power/energy consumption" refers to the fact that the device, operating normally, is able to reduce power usage compared to the devices described in the prior art. The energy used must be small enough to be stored in a battery of such size and load capacity that it can be contained within the device. The normal operation of the device is associated with the fact that it is included in an atmospheric control system involving a refrigerated container.

In general, the term "compact" refers to the fact that all parts and pieces of the atmospheric control valve device are contained within the device itself and do not require wired electrical connections either inside or outside the container. It is also light enough that it can be operated manually.

In general, the term "self-sufficient" refers to the fact that the device does not require external power for its operation while it moves from one geographical location to another. The battery can be rechargeable or disposable—preferably disposable—and is replaced each time the device starts a new journey and delivers enough autonomy for a full shipping cycle anywhere in the world.

In general, the term "reusable" refers to the fact that the device can be removed from its original position and integrated into another refrigerated container that has been previously arranged for this purpose after completing a shipment from one delivery point to another.

In general, the term "intervention in a refrigerated container" refers to the physical modifications needed in a container equipment to be able to connect the atmospheric control systems. For the devices of the present development, the preferred location is in the hatch area, although this does not exclude other areas of the refrigerated container where they can also be fitted.

In general and for the sake of clarity, a total listing of all the parts and pieces of the present development is provided below:

(1) Atmospheric control valve device
(2) Cylindrical body of the device
(3) Front or Front end of the device
(4) Back or Rear end of the device
(5) Upper portion of the cylindrical body
(6) Lower portion of the cylindrical body
(7) Front cover
(8) Front chamber
(9) Recess
(10) Exterior surface of the Front or Front end of the device (3)
(11) Perimeter O-Ring
(12) Inside surface of the Front or Front end of the device (3)
(12a) Complementary grooves
(13) Flange
(14) Frontal openings
(14a) Grooves
(15) Outside recess
(16) Interior seat
(17) Valve element
(17a) Spring
(17b) Clamping bolt
(18) Valve element body
(19) Rear seal of the valve element body
(20) Shaft
(21) Elastic piece
(22) Solenoid
(23) Rubber seal of seat and shaft
(24) Upper flow duct
(25) Upper flow duct opening
(25a) Rear edge of upper flow opening
(26) Bottom flow duct
(27) Lower flow duct opening
(27a) Rear edge of lower flow opening
(28) Central hole
(29) Central wall
(30) Central seat
(31) Rear chamber
(32) Battery area
(33) Seal cap
(34) Electronics area
(35) Battery
(36) Battery rubber
(37) Bolts with rubber
(38) Lid area
(39) Lid anchor
(40) Gas sensing area
(41) Side vent
(42) High sensor
(43) Low sensor
(44) Gas sensor cover
(45) Rubber gasket
(46) Guide trough
(47) Vane
(48) Vane recess
(49) Stability uprights
(50) Connector plug
(51) Solenoid Stem Device Description The device is generally comprised of a main body with a cylindrical, elongated tubular casing, 50 to 10 cm long, preferably 25 to 35 cm long, and most preferably 30 cm long.

The materials used for the main body are impact and temperature resistant polymers, preferably reinforced ABS. On the other hand, flexible materials were chosen for the seals and rubbers, resistant to thermal changes, generally derived from silicone or similar products, preferably silicone rubber.

On the other hand, the device includes a removable lid that covers its entire diameter, in the area of the main body facing the inside of the container.

The main body is separated into different operating zones according to their function, as partly exhibited in FIG. 8/9:

A) Battery area (32): This area is located on the lower rear side of the main body, with the front face (3) as the position exposed to the environment, and the rear face (4) as the position exposed to the inside of the container. The aforementioned upper (5) and lower (6) sides relate to a cross-section of the horizontal shaft, cutting through the elongated cylinder (1) (entire device). The battery area (32) is used to hold and contain the battery that supplies power to the entire device. This area also includes a hole for the battery connector, the cover for this area, a protective rubber band, and bolts with rubber bands to hold the cover and the battery. The battery compartment cover has two holes located at the edge of the cover around the middle part, where the two abovementioned bolts pass through to secure the cover to the device's main body. On the other hand, this entire area has a male perimeter flange (which is part of the main body) and a female perimeter flange that couples with an internal perimeter rubber band (which is part of the cover). Both male and female parts seal and isolate the area where the battery is encased, as shown in FIG. 5/9.

B) Electronics compartment: This area is located opposite (uppermost) to the battery area, i.e. on the upper rear side of the main body. This compartment includes a cover that protects the atmospheric sensors. Immediately below the sensors is the motherboard, which includes the electronics of the atmospheric controls, internal memory, wireless data transmission, solenoid valve control, control of the CO2 scrubber module outside the atmospheric control valve device (Scrubber), circuits to transmit the information to the different parts of the device, circuits for control expansions of external modules that require controlling from the same atmospheric control valve device and a voltage regulator, among other elements needed to operate the device. There is also a perimeter seal that isolates this area from the outside. The entire electronics compartment is positioned under the upper part of the cylindrical body (5). Only the atmospheric sensors that need to be exposed to the atmosphere inside the container are protected by a gas sensor cover (44). A connector plug (50) leaves from here towards the lid area, into which the CO2 scrubber control can be connected, as shown in FIG. 7/9, among other external modules that need to be controlled from the atmospheric control valve device.

C) Handling compartment: This area is bounded only on the side exposed to the outside of the device (top and bottom), because its purpose is to be able to manipulate the entire device in order to remove it from its original position for repairs, reloading or replacement of containers. Specifically, the design for this compartment allows the "Liventus®" logo to be displayed on the outside either in 2D or 3D. On the other hand, the design of this area is functional, in the sense that its shape lets the operator insert his fingers to remove or insert the device. To achieve this result, this area features a series of front openings towards the bottom of the horizontal cross-section. On the other side, towards the top, there is a sort of crescent-shaped handle with the company logo, whose outer perimeter is formed by the device's edge (deeper than the crescent shape), as shown in FIG. 6/9.

D) Lid compartment: This area of the device is operationally positioned inside the container. This compartment can be detached from the device's body and its purpose is to seal the container after the device is removed, in order to maintain controlled temperatures when the container is used without the atmospheric control device.

The lid may or may not be mechanically attached to the device's body. The purpose of this anchorage is to prevent the cover from becoming lost or dropped if it is not properly fastened to the inner surface of the container.

E) Flow exchange compartment: This part of the device is located between the battery and the handling compartments. This zone cuts through the device from top to bottom in order to control the flow of gases into the container.

This compartment consists mainly of the valve, the solenoid, the shaft, the upper and lower flow ducts with their respective openings, the different seals, the central hole, the central wall and its respective seat, among other parts that will be more thoroughly explained in the description of the figures and in the preferred embodiment of the invention.

DESCRIPTION OF THE FIGURES

In order to better explain the invention's features, the description includes a set of drawings for an example of a preferred embodiment, in which the invention has been illustrated in a non-limiting manner.

Figure 2:
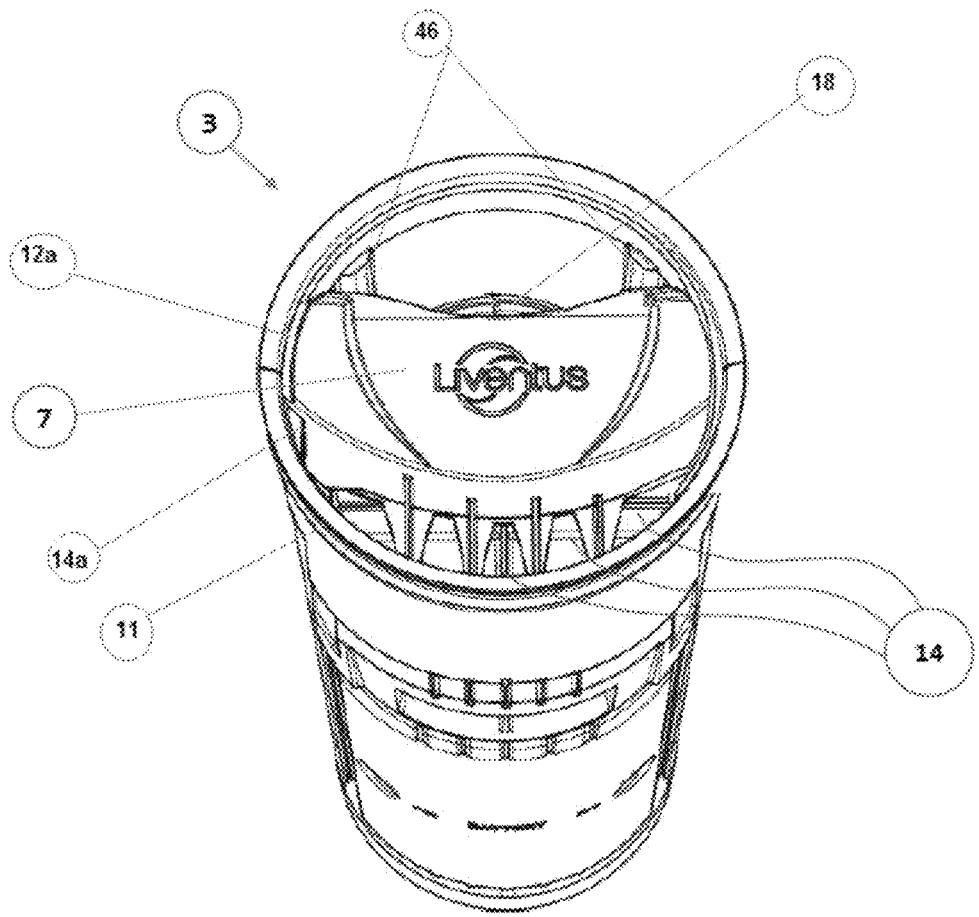

This figure also shows the following specifications:
- (1) Atmospheric control valve device
- (2) Cylindrical body of the device
- (3) Front or Front end of the device
- (4) Back or Rear end of the device
- (5) Upper portion of the cylindrical body
- (6) Lower portion of the cylindrical body
- (7) Front Cover
- (11) Perimeter O-Ring
- (15) Outside recess
- (26) Bottom flow duct
- (27) Lower flow duct opening
- (32) Battery area
- (33) Seal cap
- (34) Electronics area
- (36) Battery rubber
- (37) Bolts with rubber
- (38) Lid area
- (39) Lid anchor
- (45) Rubber gasket
- (46) Guide trough FIG. 2, corresponds to the lower front view of the atmosphere control valve according to the invention.

Figure 1:
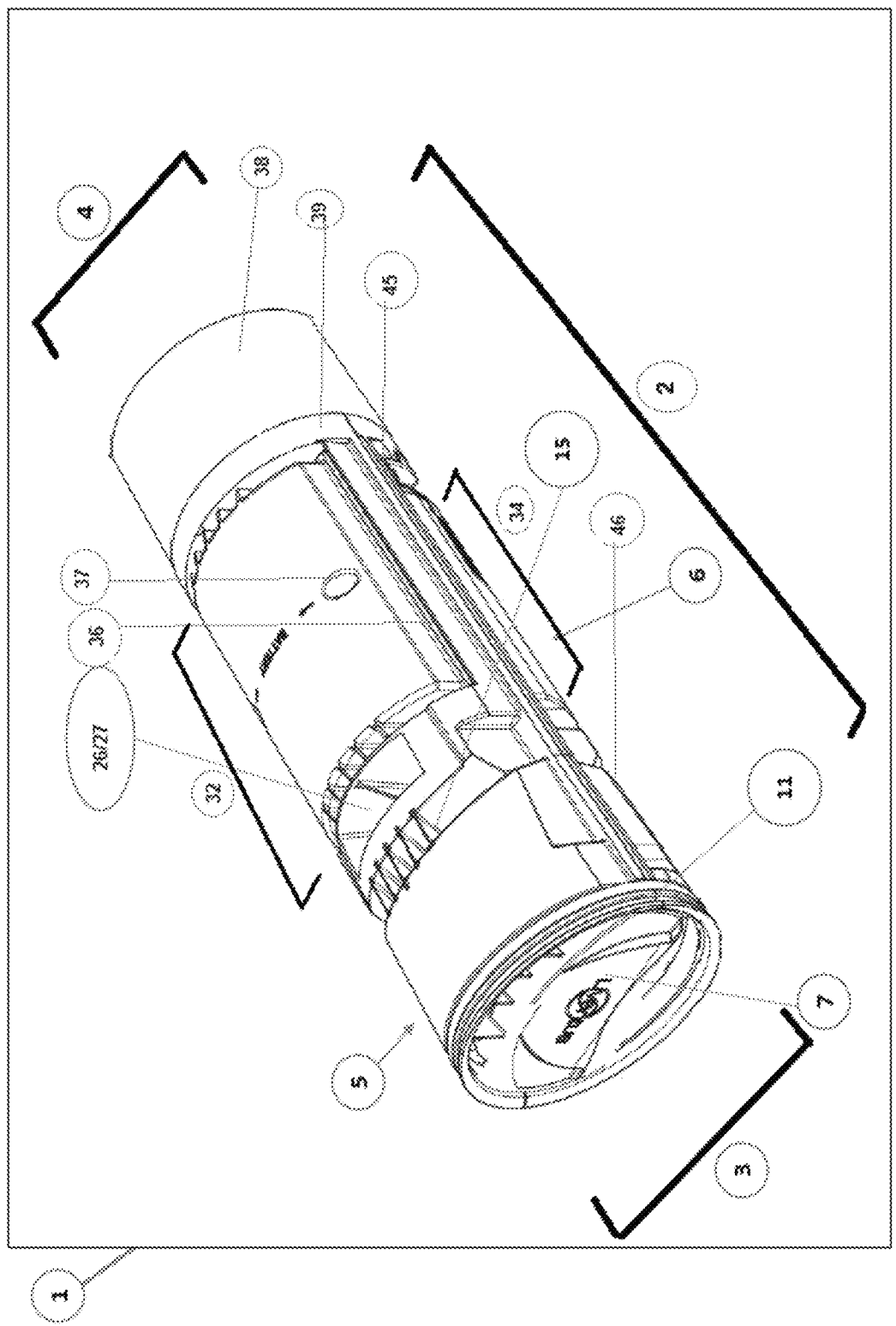
FIG. 1, corresponds to a lower perspective view of an atmospheric control valve for a refrigerated container according to the invention.
Figure 3:
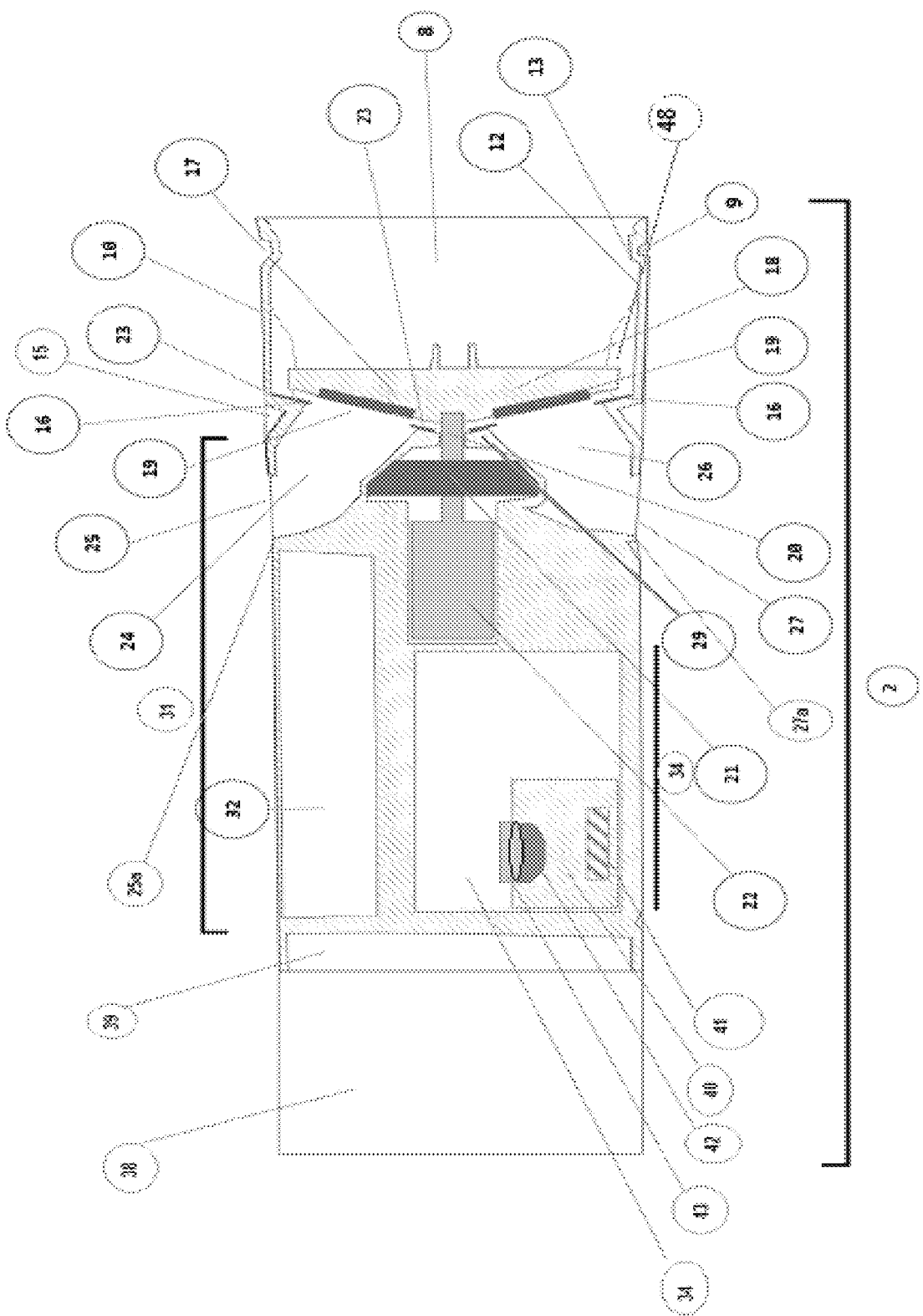

On the other hand, this figure shows the following specifications:
- (3) Front or Front end of the device
- (7) Front cover
- (11) Perimeter O-Ring
- (12*a*) Complementary grooves
- (14) Frontal openings
- (14*a*) Grooves
- (18) Valve element body
- (46) Guide trough FIG. 3, corresponds to a lateral cross-sectional view, according to cut A-A of FIG. 1/9, of the invention's atmospheric control valve.

Figure 4:
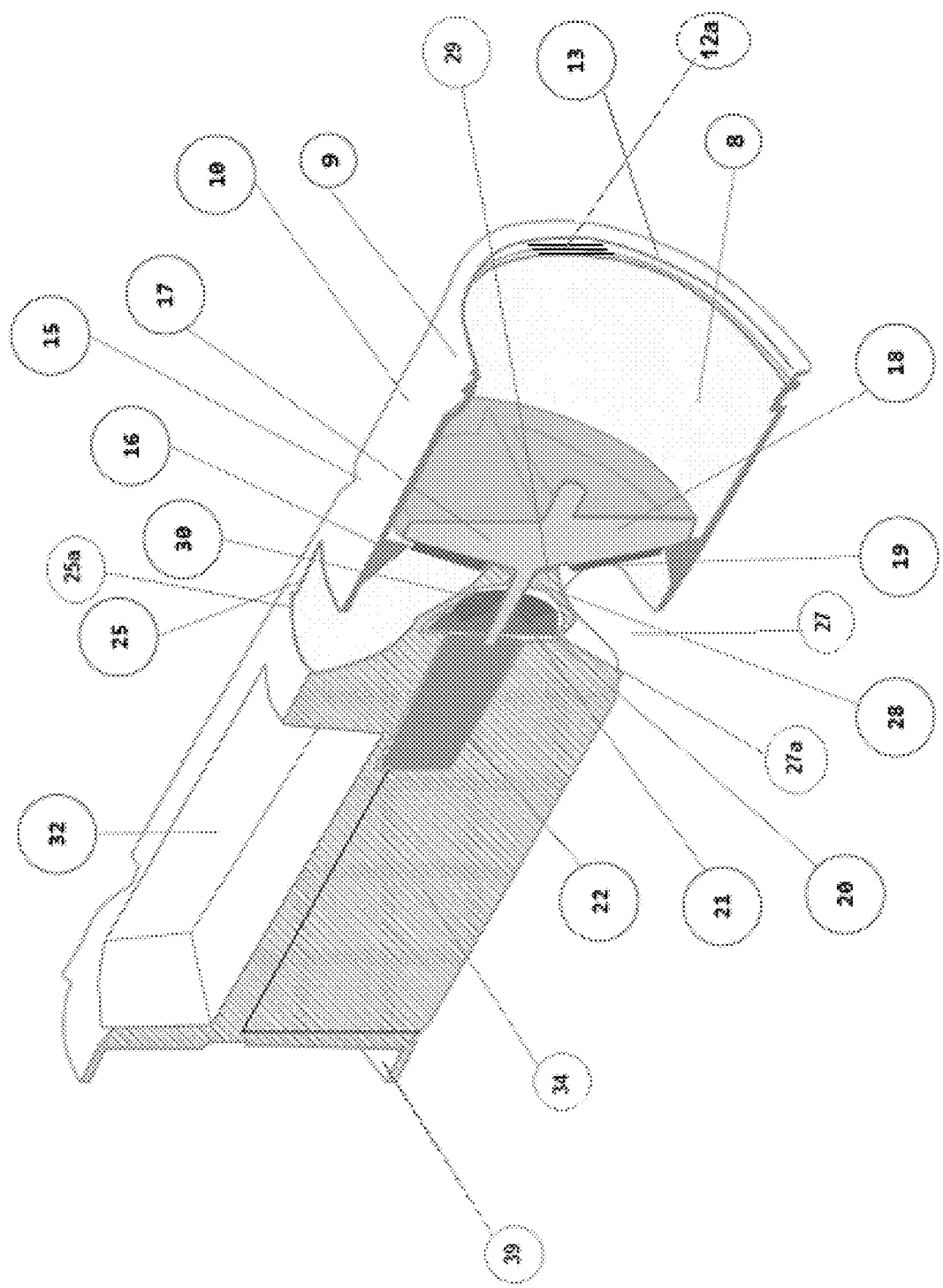

This figure also shows the following specifications:
- (2) Cylindrical body of the device
- (8) Front chamber
- (9) Recess
- (10) Exterior surface of the Front or Front end of the device (3)
- (12) Inside surface of the Front or Front end of the device (3)
- (13) Flange
- (15) Outside recess
- (16) Interior seat
- (17) Valve element
- (18) Valve element body
- (19) Rear seal of the valve element body
- (20) Shaft
- (21) Elastic piece
- (22) Solenoid
- (23) Rubber seal of seat and shaft
- (24) Upper flow duct
- (25) Upper flow duct opening
- (25*a*) Rear edge of upper flow opening
- (26) Bottom flow duct
- (27) Lower flow duct opening
- (27*a*) Rear edge of lower flow opening
- (29) Central wall
- (31) Rear chamber
- (32) Battery area
- (34) Electronics area
- (38) Lid area
- (39) Lid anchor
- (40) Gas sensing area
- (41) Side vent
- (42) High sensor
- (43) Low sensor
- (48) Vane recess FIG. 4 is a cross-section perspective view according to the A-A cut of FIG. 1/9, of the invention's atmospheric control valve.

This figure also shows the following specifications:
- (8) Front chamber
- (9) Recess
- (10) Exterior surface of the Front or Front end of the device (3)
- (12*a*) Additional grooves
- (13) Tab
- (15) Outside recess
- (16) Interior seat
- (17) Valve element
- (18) Valve element body
- (19) Rear seal of the valve element body
- (20) Shaft
- (21) Elastic piece
- (22) Solenoid
- (25) Upper flow duct opening
- (25*a*) Rear edge of upper flow opening
- (27) Lower flow duct opening
- (27*a*) Rear edge of lower flow opening

Figure 5:
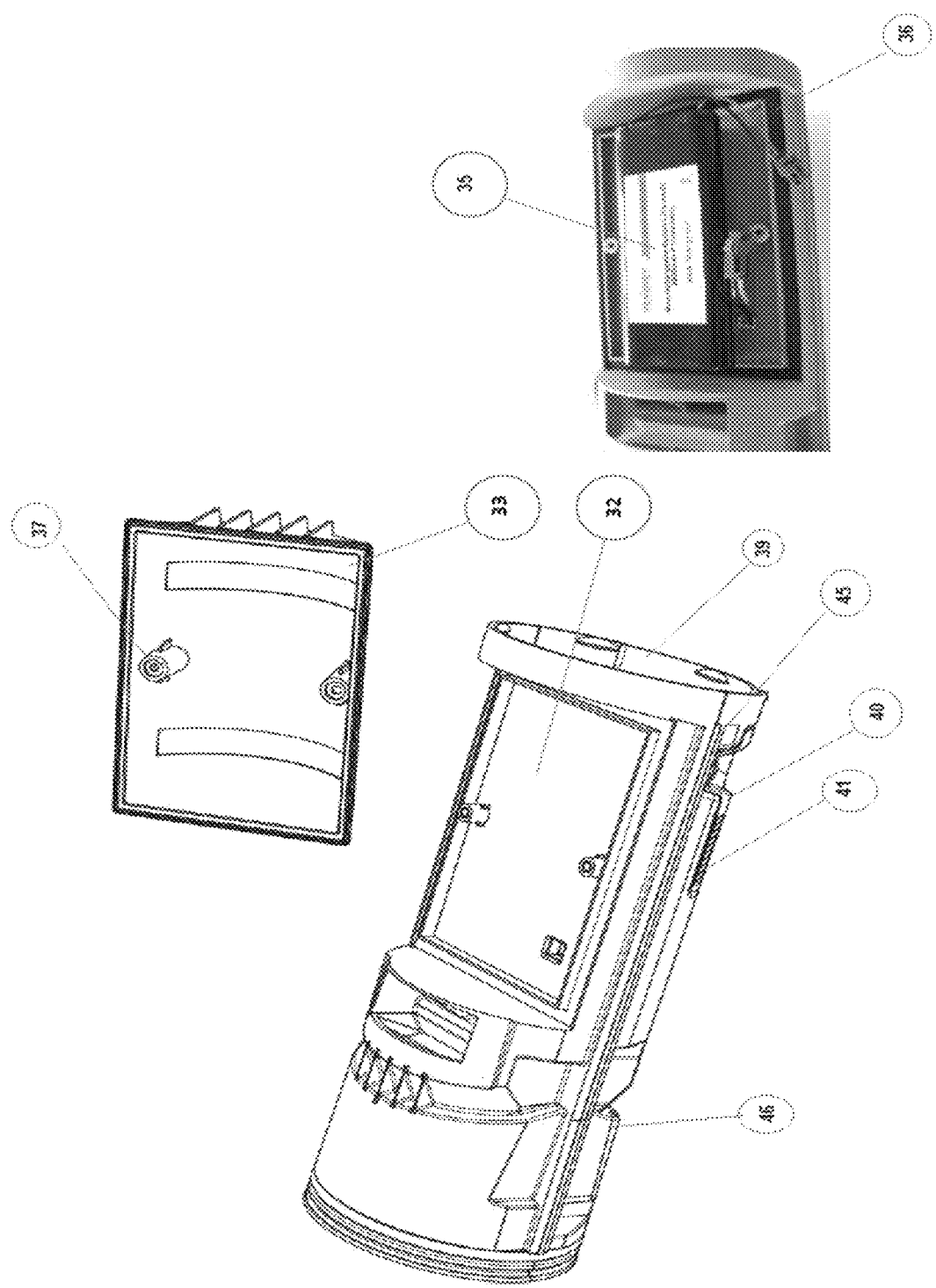

(28) Central orifice
(29) Central wall
(30) Central seat
(32) Battery area
(34) Electronics area
(39) Lid anchor FIG. 5 is a top perspective view of the parts on the back of the invention's atmospheric control valve.

This figure also shows the following specifications:
(32) Battery area
(33) Seal cap
(35) Battery
(36) Battery rubber
(37) Bolts with rubber
(39) Lid anchor
(40) Gas sensing area
(41) Side vent
(46) Guide trough FIG. 6 corresponds to three groups of figures:

The top group shows a front and rear perspective view of the gas sensor cover of the invention's atmospheric control valve.

The middle group shows a front and rear perspective view of the body of the invention's atmospheric control valve.

The lower group shows a front and rear view of the front cover of the invention's atmospheric control valve.

Figure 7:
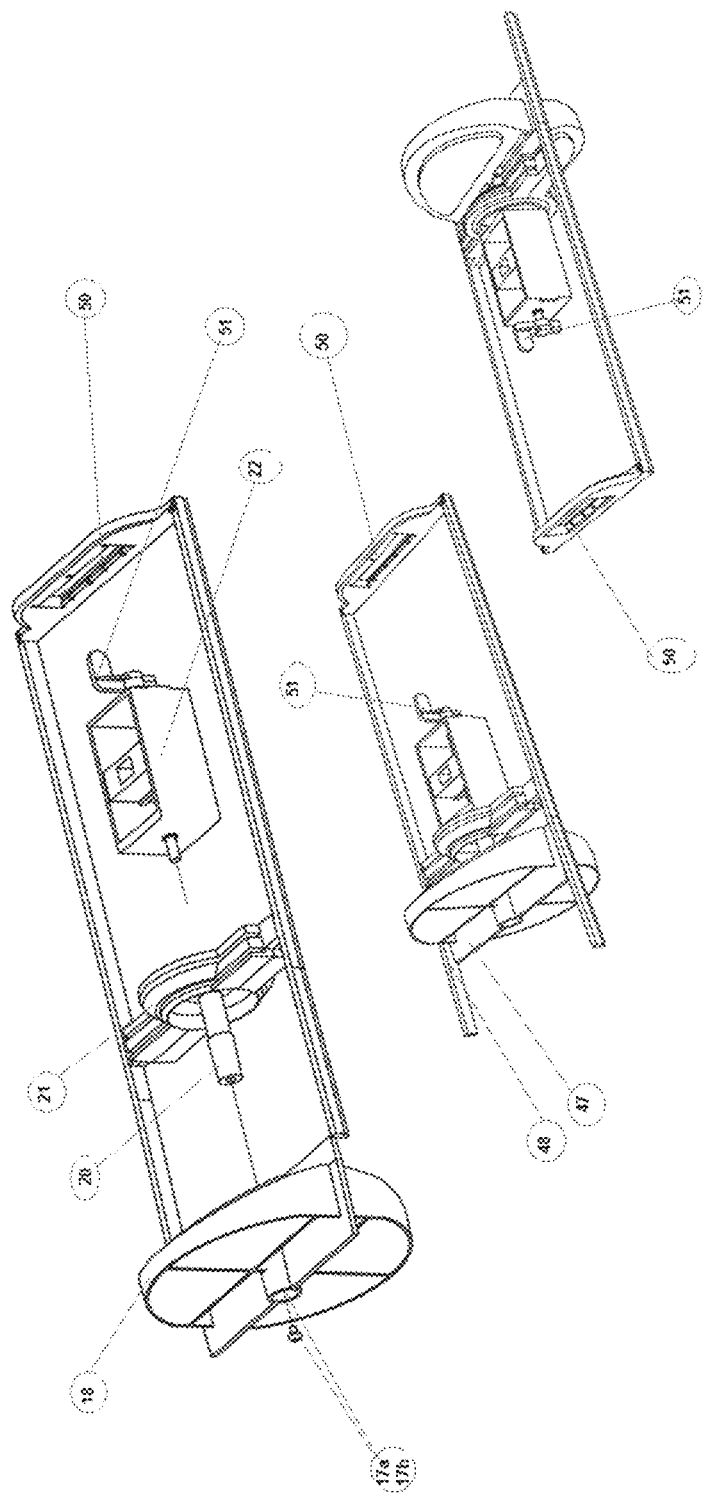

This figure also shows the following specifications:
(14) Frontal openings
(14a) Grooves
(17a) Spring
(17b) Tightening bolt
(18) Valve element body
(19) Rear seal of the valve element body
(20) Shaft
(21) Elastic piece
(41) Side vent
(44) Gas sensor cover
(47) Vane
(49) Stability uprights FIG. 7 corresponds to two groups of figures:

The diagram on the left shows the positional relationship of the shaft (20) with all the parts that operate on this shaft. The rear (4), in contact with the lid compartment, also features the connector plug (50), which connects the device's motherboard with other devices and appliances outside the atmospheric control valve device.

Figure 8:
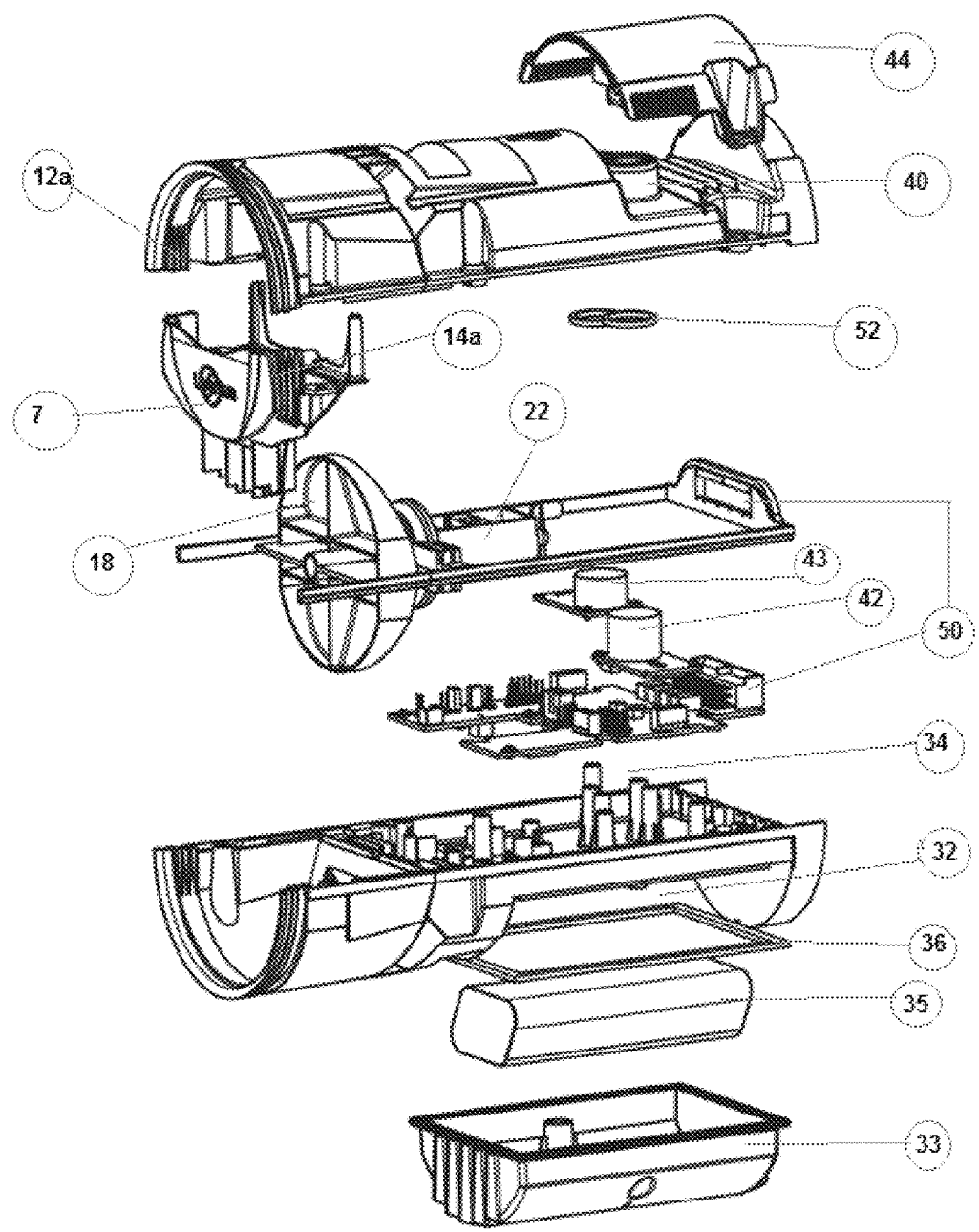

This figure also shows the following specifications:
(17a) Spring
(17b) Tightening bolt
(18) Valve element body
(20) Shaft
(21) Elastic piece
(22) Solenoid
(47) Vane
(48) Vane recess
(50) Connector plug
(51) Solenoid Stem FIG. 8 shows a partial view of the pieces in the atmospheric control valve device.

Figure 9:
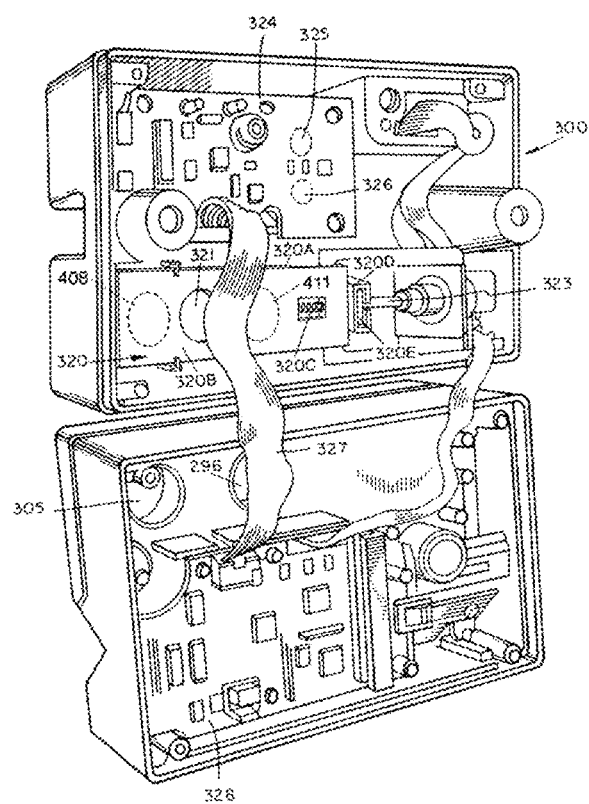

This figure also shows the following specifications:
(7) Front Cover
(12a) Complementary grooves
(14a) Grooves
(18) Valve element body
(22) Solenoid
(32) Battery area
(33) Seal Cover
(34) Electronics area
(35) Battery
(36) Battery Rubber
(40) Gas sensing area
(42) High sensor
(43) Low sensor
(44) Gas sensor cover
(50) Connector plug
(52) Sensor protection seal FIG. 9 shows a perspective top view of a prior art device with respect to the present invention, where an atmospheric control valve with high mechanical complexity and high energy consumption is depicted.

PREFERRED EMBODIMENT OF THE INVENTION

The invention corresponds to an atmospheric control valve device (1) that is part of an atmospheric control system for a refrigerated cargo container, for the transport of perishable cargo such as fruit. This valve device has an elongated cylindrical shape, as shown in FIG. 1/9. The cylindrical body (2) has a front face or end (3), a rear face or end (4), an upper portion of the cylindrical body (5) forming an elongated upper semicircle, and a lower portion of the cylindrical body (6) forming an elongated lower semicircle. These body portions (5, 6) form the cylindrical body of the atmospheric control valve device (1).

The upper part of the cylindrical body (5), comprising the upper part of the front end (3) and the upper part of the rear end (4), is made of one piece. Likewise, the lower part of the cylindrical body (6) comprising the lower part of the front end (3) and the lower part of the rear end (4) are also made of one piece. These two parts (5) and (6) are joined by 4 bolts, which have a recess in their respective positions within the cylindrical body so that the bolts can be more easily handled during assembly or disassembly. The connection between these two parts (5) and (6) is separated by a rubber gasket (45) in order to keep all the elements contained in these parts isolated.

Outside, the atmospheric control valve device (1) has guide troughs (46) along its body, which allow the device to be correctly positioned.

The atmospheric control valve device (1) has a front cover (7) (shown in detail in FIG. 2/9), which is inserted into a front chamber (8) (shown in FIGS. 3/9 and 4/9). This cover is inserted into the front end (3) of the atmospheric control valve device (1). This front end (3) has a recess (9) in its outer surface (10), which serves as a means to retain a perimeter o-ring (11), which fits in the recess (9) of the outer surface (10) of the device's front face (3). This recess (9) produces a flange (13) inside the front chamber (8), surrounding the entire circular perimeter of the inner surface of the device's front face (12), which allows the front cover (7) to be adjusted and attached to the front end of the device (3). The front cover (7) has a number of front openings (14) that allow flows of air and such gases to enter or exit from the outside of the container.

On the other hand, this front cover (7) allows handling the atmospheric control valve device (1), so that it can be introduced or removed from and to its operating position. To prevent the front cover (7) from slipping out of its operational position when being handled, a series of grooves (14a) are positioned in the lateral contour of the front cover (7) that, together with additional grooves (12a) arranged in the inner perimeter of the front face of the device (12), anchor the part to the device's edge. Both grooves (14a and 12a) are positioned midway across the horizontal plane of the device, between the upper and lower portions of the cylindrical body (5, 6). At the same time and a little further back than the grooves (14a) are the stability uprights (49), two points that stabilize the front cover (7), anchoring it under the guide trough (46) on the inner surface of the front face (12).

As can be seen in FIGS. 3/9 and 4/9, the orifice (8) is deep enough for there to be a chamber behind the cover (7), limited by an external recess (15) in the circumferential perimeter of the outer surface (10) of the valve body's upper (5) and lower portions (6), creating an inner seat (16) on the inner surface (12) of the valve device's front face. This seat is at the bottom of the orifice (8), and is used to support a valve element (17). The seat (16) has a rubber seal for the seat and the shaft (23) on the face opposite to the valve element's body (18), which will fit part of the valve element body's rear face (18). The valve body (18) has a relatively smaller diameter than the internal diameter of the orifice (8). The solid body (18) of the valve element (17) contains a seal (19) on its rear face and to the side of the valve body's center, which may be made of rubber, partly surrounding the rear part of the valve body (18) of the valve element (17). It is placed around an shaft (20) from the center of the body (18) of the valve element (17), so that the edge of the rear seal of the valve element's body (19) remains next to the edge of the rubber seal (23) of the seat (16). The shaft (20) of the valve element (17) protrudes from the body (18) towards the bottom of the valve body, and is connected to an elastic part (21) located inside an enclosing chamber. The elastic piece finally separates the compartment where the electronics are located from the area where the air flows circulate. The shaft (20) of the valve element crosses the elastic part (21) through its center connecting it by one end to a solenoid (22).

In order to keep the valve element body (18) moving evenly when the valve is opened and closed, there are two flanges on the sides of the horizontal shaft (47) that work as a sled, keeping the valve element body upright. In addition, both the upper and lower parts of the cylindrical body (5 and 6) contain a flange recess (48) to mount the flanges (47) so that they can move without bumping into any other part of the device.

As for the valve element (17), on the outside it comprises the valve element body (18) and the rear seals of the valve element body (19). On the inside, and through the valve element body's (18) center, is a clamping bolt (17b) and a spring (17a). These internal elements anchor and provide flexibility to the connection between the valve element body (18) and the shaft (20), which is in turn anchored to the solenoid (22).

The valve body (18) of the valve element (17) is set up in such a way that the rear of the valve body (18) shuts a first upper flow duct (24) that is formed in the upper part (5) of the valve body and that extends from the edge of the seat (16) to the rear edge of the upper flow duct opening (25a) on the upper part (5) of the body, where there is an upper flow duct opening (25). A second lower flow duct (26) is formed at the bottom (6) of the valve body, extending from the edge of the seat (16) to the rear edge of the lower flow duct opening (27a) at the bottom (6) of the body, where there is a lower flow duct opening (27). The recess that houses the elastic part (21) that is attached to the shaft (20) of the valve element (17) includes a central orifice (28) where the shaft (20) passes through to the body (18) of the valve element (17). This recess and central orifice (28) are formed by a central wall (29) that surrounds the recess and forms part of the wall that comprises the lower and upper flow ducts (24,

26). This central wall (29) shapes a central seat (30) made up of a wall surrounding the shaft (20), so that the central seat (30) comprises a rubber seal of the seat and the shaft (23) whose edge coincides with the edge of the seal (19) of the valve element's body (18).

This set of elements and arrangement of the front portion of the valve body, defined by the front end (3) of the valve body and the openings (25, 27) of the flow ducts (24, 26) of the upper and lower portions (5, 6) of the valve body, forms a first air exchange area, and the rear of the valve body forms a stagnation area.

The stagnant area, which is formed by the rear portion of the valve element body (18), comprises a rear chamber (31) at the rear edge of the upper flow opening (25a) and at the rear edge of the lower flow opening (27a) in the body portions (5, 6) respectively, as shown in FIG. 3/9. Two sub-zones are formed in this rear chamber (31): the battery compartment (32) and the electronics compartment (34). As the name suggests, the battery compartment (32) houses a battery (35), which allows the equipment to operate autonomously. The electronics compartment (34) houses a number of electronic and electrical circuits, elements and sensors inside the body, which allow the valve to operate. Generally speaking, in the rear area of this compartment there are two sensors called high sensor (42) and low sensor (43) that detect O2 and CO2 concentrations (to gauge the behavior of the gases inside the container), which provide electrical signals to the solenoid stem (51) through a processor, which in turn moves the solenoid (22), opening and closing the valve element body (18) in order to control the container's atmosphere. The position of the sensors was designed to be representative in the detection of gases. The sensors are in turn protected on the surface by a sensor protection seal (52) and in particular by a gas sensor cover (44), which has two side vents (41) within its structure that allow the passage of gases from the container to the sensors. On the rear face (4) (included in the electronics compartment) there is a connector plug (50) that projects into the area near the lid, used to optionally connect external modules that are not part of the atmosphere control valve device and that add other functions to the refrigerated container's atmospheric control, including a CO2 scrubber.

On the other hand, the battery compartment (32) is protected by a seal cover (33) and anchored by two rubber bolts (37), holding the battery (35) in place, while the battery rubber (36) provides an airtight seal for the battery chamber.

Based on FIG. 3/9, we will proceed to describe the manner in which the atmospheric control valve device (1) of the invention operates, as well as the benefits and advantages provided by its setup and form. The elastic piece (21) directs the movement of the solenoid (22) towards the body of the valve element (18), separating the stagnant area from the flow passage compartment (formed by the upper flow duct (24), the upper flow duct opening (25), the lower flow duct (26), the lower flow duct opening (27), the central orifice (28)), all in a unified form and in a single piece, which strengthens and solidifies the valve setup. The setup of the two ducts and the valve element's (17) operation provide for a valve with two flow exchange openings for gases and/or air, formed by the ducts (24, 26). They operate as air inlets or outlets, respectively, and do not depend on a specific position to operate, letting the valve work in two directions. The valve element (17) seal is formed by the seals (19 and 23), used to efficiently open and close the solenoid. The airtight seal added to the pressure differences generated by the thermal gradient captured by the openings (25) and (27) make the solenoid require less force to operate the valve element (17), thus achieving a greater air transfer area with less force, and therefore less effort and a lesser failure probability. The fact that the valve element (17) comprises a single mechanism that operates both the inlet and outlet flow for air and/or gases, simultaneously by means of a single solenoid, allows reducing energy consumption. This allows the system to be electrically powered with a battery (35), providing autonomy to the atmospheric control valve device of the invention.

Figure 6:
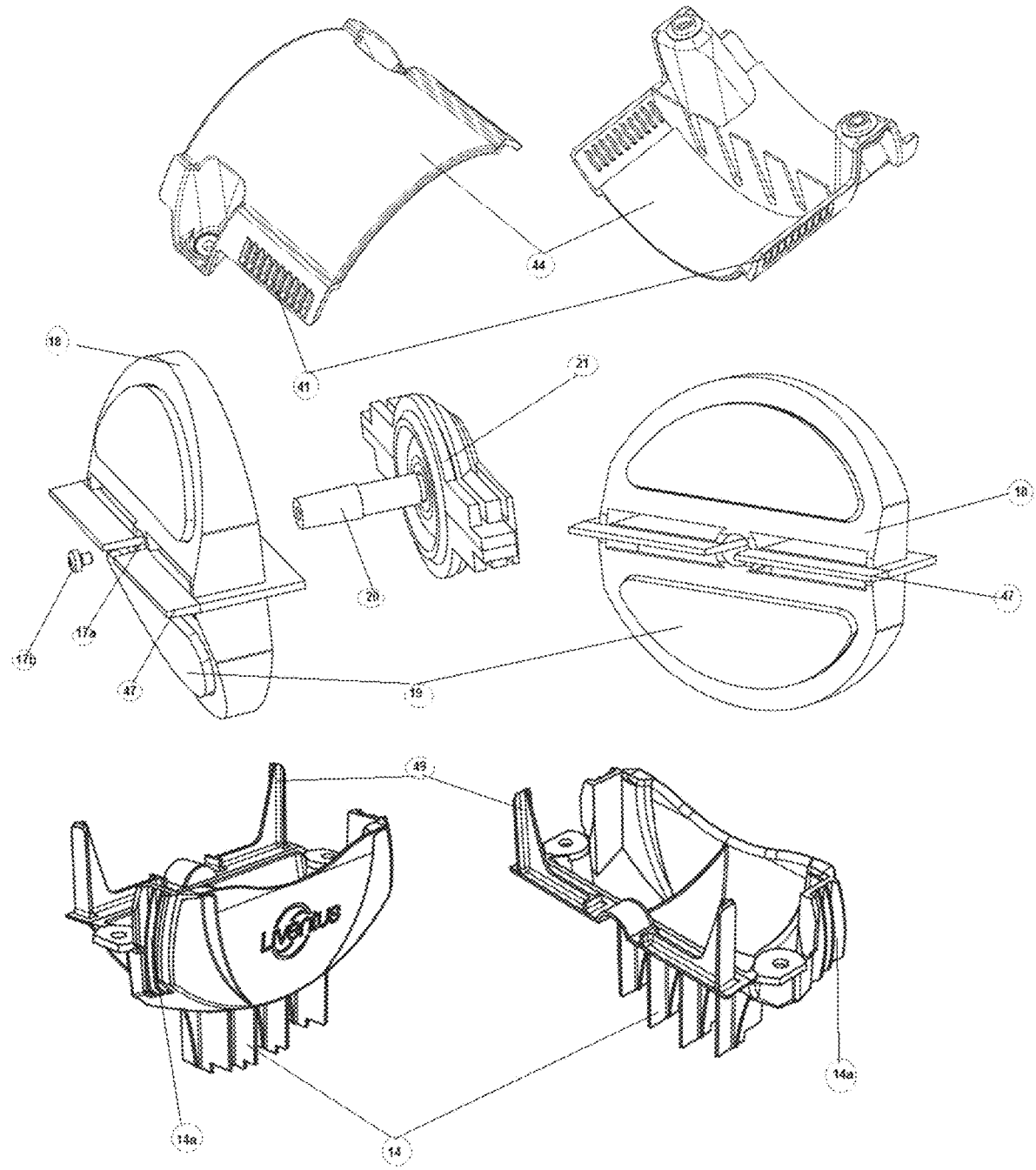

As can be seen in FIGS. 3/9 and 4/9, the shape of the cavities or flow ducts (24, 26) lean from their opening extending towards the center of the valve element's body (18) facing towards its front, where the central seat and rubber seal of the seat and the shaft (30, 23) are located. These lean to the front, toward the outside surface of the valve's body. The inner seat and the rubber seals of the seat and shaft (16, 23) of the inner surface of the valve element's body (18) follow the same direction and inclination of the inner seat and rubber seal of the seat and shaft. The rear of the valve element's body (18) has a "V" shape set towards the interior of the body and towards the bottom of the valve body (17). Due to this shape and the setup of the flow exchange compartment elements for gases and/or air, the inlet and outlet flows are separate, coming from separate compartments. The angle of these elements and components in the center of the valve element's body (18) also provide an intermediate division to the valve, allowing differentiated flows of gas and/or air, as shown in FIG. 6/9.

The shape, setup and operation of the present invention's atmospheric control valve device allows for easy manipulation, saving space, energy and parts. This is achieved by providing a small, automatic, compact, unique, robust, autonomous, manipulable and efficient valve device, which incorporates all electrical and electronic accessories, as well as the sensor elements inside its body, avoiding the use of cables and other devices outside the valve device's body or as accessories attached to the valve or controller in order to form the atmospheric control system, which can be easily damaged. This atmosphere control valve device requires minimal intervention of the refrigerated container, thus reducing implementation, operation and maintenance costs, facilitating its modification.

While the shape of the atmospheric control valve described herein is a preferred embodiment of this invention, it must be pointed out that the invention is not limited to this precise valve shape, and that changes can be made without breaking away from the scope of the invention.

The invention claimed is:

1. An atmospheric control valve device, requiring minimal intervention in its installation in refrigerated containers, self-sufficient, compact, and reusable, WHEREIN its body has an elongated cylindrical shape that allows for atmospheric control; the body in turn contains a battery compartment; an electronics compartment with the electrical, electronic and sensor elements comprising atmospheric sensors adapted to sense atmospheric conditions including oxygen ($O_2$) and carbon dioxide ($CO_2$) levels; a handling compartment defining a cavity and having a front cover, a plurality of frontal openings, and an outside recess for handling the device; a lid area for capping the container once the device is removed and comprising a lid compartment, a lid, and a lid anchor; and a flow exchange compartment disposed between the battery compartment and the handling compartment and having a valve element with a valve element body, a plurality of ducts, a central orifice, an elastic piece, a plurality of seals, a plurality of openings, a shaft, and a two-way gas exchange media controlled by a solenoid valve and the natural pressure differences produced within the refrigerated containers.

2. The atmospheric control valve device, according to claim 1, WHEREIN said device is part of an atmosphere control system for a refrigerated cargo container that transports perishable goods.

3. The atmospheric control valve device, according to claim 1, WHEREIN the device's body consists of a front face or end (3), a rear face or end (4), an upper portion of a cylindrical body (5) that forms an elongated upper semicircle, and a lower portion of the cylindrical body (6) that forms an elongated lower semicircle, where said body portions (5,6) form the elongated cylindrical shape.

4. The atmospheric control valve device, according to claim 3, WHEREIN the upper portion of the cylindrical body (5) that contains an upper part of the front end (3) and the upper portion of the rear end (4), are manufactured as one single piece; and wherein the lower part of the cylindrical body (6) that comprises the lower part of the front end (3) and the lower part of the rear end (4) are also made as one single piece; and wherein a rubber gasket (45) is wedged between the upper portion of the cylindrical body (5) and the lower portion of the cylindrical body (6), in order to keep the upper portion and the lower portion isolated.

5. The atmospheric control valve device, according to claim 1, WHEREIN the body of the atmospheric control valve device includes guide troughs (46) along its outside, which guide the device for correct positioning.

6. The atmospheric control valve device, according to claim 1, WHEREIN the front cover of the handling compartment is inserted in a front chamber (8), so the cover is inserted in a front end (3); and wherein the front end (3) has a recess (9) on its outer surface (10), which receives a perimeter O-ring (11) that is placed on this recess (9) on the outer surface (10) of the front face of the device (3); and wherein the recess (9) creates a flange (13) inside the front chamber (8) that surrounds the entire circular perimeter of the inner surface of the front face (12) of the device, which allows adjusting and placing the front cover (7) in said front end of the device (3); and wherein the frontal openings of the front cover (7) allow the intake or outlet of flows, such as air, from the outside of the container.

7. The atmospheric control valve device, according to claim 6, WHEREIN a lateral contour of the front cover (7) features a series of grooves (14a) to handle the front cover (7) and prevent it from slipping out of its operational position; and wherein together with the complementary grooves (12a) on an inner perimeter of the device's front face (12), they anchor the front cover to an edge of the device; and wherein, both grooves (14a and 12a) are located substantially halfway in front of the device as seen horizontally, between an upper portion and a lower portion of the cylindrical body (5, 6), in parallel; and wherein a little further back than the grooves (14a) are a plurality of stability uprights (49), which are two points used to stabilize the front cover (7), anchoring it below a guide trough (46) on the inner surface of the front face (12).

8. The atmospheric control valve device, according to claim 6, WHEREIN within the handling compartment, the cavity (8) that exists behind the front cover (7) which is itself bounded by the outside recess (15) in the circumferential perimeter of the outer surface (10) of an upper portion (5) and of a lower portion (6) of the body of the device, creates an inner seat (16) on the inner surface (12) of the front face of the device; and wherein said inner seat bounds the bottom of the cavity (8), and is used to place the valve element (17).

9. The atmospheric control valve device, according to claim 1, WHEREIN an interior seat (16) within the flow exchange compartment has a rubber seal for the seat and shaft (23) on its face that looks towards the body of the valve element (17); and wherein said rubber seal being used to place a rear face of the valve element body (18), whose diameter is relatively smaller than the inner diameter of the cavity; and wherein the valve element body (18) is solid and has a seal (19) on its rear face that is somewhat displaced from the center to the side; and wherein said seal comprises rubber, surrounding the rear of the body of the valve element (17), and placed around the shaft (20) protruding from the center of the body of the valve element, in such a way that the edge of the rear seal of the body of the valve element is adjacent to an edge of the rubber seal (23) of the interior seat (16), where the shaft (20) of the valve element (17) protrudes from the valve element body (18) toward the bottom of the valve body, and which is attached to the elastic piece (21) that is placed inside a chamber that encloses it; and wherein the elastic piece separates the area where the electronic elements are located from the area where the air flows; and wherein the shaft (20) of the valve element passes through the elastic piece (21) through its center, connecting the solenoid valve on one of its ends (22).

10. The atmospheric control valve device, according to claim 9, WHEREIN in order to ensure that the body of the valve element moves steadily whenever the valve opens and closes, a pair of vanes (47) are placed on the outside around the shaft, working together as a sledge to keep the body of the valve element upright; and wherein both an upper portion and a lower portion of the cylindrical body (5 and 6) have vane recesses (48) for the vanes (47), to ensure that they can move freely without colliding with other parts of the device.

11. The atmospheric control valve device, according to claim 9, WHEREIN the valve element (17), on its inside and throughout its center, contains a clamping bolt (17b) and a spring (17a); and wherein the bolt and the spring anchor and provide flexibility to the union between the body of the valve element (18) and the shaft (20), which is in turn anchored to the solenoid valve (22).

12. The atmospheric control valve device, according to claim 1, WHEREIN the rear of the body of the valve element within the flow exchange compartment closes a first upper flow duct (24) in an upper portion (5) of the valve element body; and wherein the first upper flow duct extends from an edge of a seat (16) to a rear edge of an upper flow duct opening (25a) in the upper portion (5) of the body, defining an upper flow duct (25) on the opposite side; and wherein a second lower flow duct (26) is formed at a lower portion (6) of the valve element body, which extends from the edge of the seat (16) to a rear edge of a lower flow duct opening (27a) at the lower portion (6) of the body, defining a lower flow duct opening (27).

13. The atmospheric control valve device, according to claim 9, WHEREIN the cavity where the elastic piece (21) is located, which is connected to the shaft (20), said shaft (20) penetrates through the central orifice towards the valve element body (18); and wherein said cavity and central orifice (28) are formed by a central wall (29) that surrounds the orifice, forming and being part of the wall that forms a lower flow duct and an upper flow duct (24, 26); and wherein said central wall (29) has a central seat (30) made up of a wall that surrounds the shaft (20); and wherein the central seat (30) has a rubber seal for the seat and shaft (23), whose edge coincides with the edge of the seal (19) of the valve element body (18).

14. The atmospheric control valve device, according to claim 1, WHEREIN the electronics compartment and the battery compartment are enclosed within a watertight area in the rear of the valve element body (18); and wherein the watertight area has a rear chamber (31) at a rear edge of an upper flow duct opening (25a) and at a rear edge of a lower flow duct opening (27a) in an upper portion of the cylindrical body and a lower portion of the cylindrical body (5 and 6), respectively.

15. The atmospheric control valve device, according to claim 14, WHEREIN the battery compartment (32) includes a battery (35) that allows the equipment to operate autonomously; and wherein said battery compartment is protected by a seal cover (33) and anchored by two bolts with rubbers (37), allowing the battery (35) to be held in place and at the same time providing an airtight seal by way of a battery rubber (36) inside the battery compartment.

16. The atmospheric control valve device, according to claim 14, WHEREIN the electronics compartment (34) includes a series of circuits used to operate the valve element and wherein some elements are set up in the rear of the electronics compartment, such as a high sensor (42) and a low sensor (43), each of which detects O2 and CO2 concentrations and delivers electrical signals to the solenoid valve (22) regarding the behavior of the gases inside the containers; and wherein the solenoid valve opens and closes the valve element body (18), in order to control the atmosphere in the containers; and wherein the sensors are protected by a gas sensor cover (44) with two side vents (41), which allow gases to enter the containers toward the sensors.

17. The atmospheric control valve device, according to claim 12, WHEREIN within the flow exchange compartment, the valve element comprises seals (19 and 23), which allow for an efficient closing and opening of the solenoid valve; and wherein the airtightness of the seals plus the pressure differences created by the thermal gradient and captured inside the containers by the duct openings (25) and (27) make the solenoid valve require less force to activate the valve element (17), thus achieving a greater air transfer area with less force, with fewer stress tensions, and a lower probability of failure; and wherein the valve element (17) involves a single mechanism to drive both the flow intake and outlet simultaneously through a single solenoid valve, thereby reducing energy consumption and allowing the valve element to be powered electrically with a battery (35).

18. The atmospheric control valve device, according to claim 12, WHEREIN within the flow exchange compartment, the shape of the holes or flow ducts (24, 26) slant from their opening towards the center and front of the valve element body (18) where a central seat and a rubber seal of the seat and shaft (30, 23) are located, leaning towards the front; and wherein the inner seat and rubber seal of the seat and shaft (16) follow the same direction and inclination of the inner seat and rubber seal of the valve body (16, 23); and wherein the rear of the valve element body (18) is shaped like a "V" and set towards the inside of the body and towards the bottom of the valve element (17); and wherein the shape and setup of the elements in the flow exchange compartment allows separating the intake and outlet flows, since they take place in separate compartments; and wherein the angle of the elements and components in the central part of the valve element body (18) provide an intermediate division to the valve device, thus achieving a differentiated gas flow direction.

19. The atmospheric control valve device, according to claim 16, WHEREIN the electronics compartment has a connector plug (50) that extends towards the lid area, around the center of a rear face (4); and wherein external modules that are not part of the atmosphere control valve device can be connected to it, such as a CO2 scrubber, providing additional functionalities to control the atmosphere in the refrigerated containers.

20. The atmospheric control valve device, according to claim 12, WHEREIN the cavity where the elastic piece (21) is located, which is connected to the shaft (20) of the valve element, said shaft penetrates through the central orifice (28) towards the valve element body (18); and wherein the cavity and the central orifice (28) are formed by a central wall (29) that surrounds the central orifice, forming and being part of the wall that forms the lower and upper flow ducts (24, 26); and wherein the central wall (29) has a central seat (30) made up of a wall that surrounds the shaft (20); and wherein the central seat (30) has a rubber seal for the seat and shaft (23), whose edge coincides with the edge of a rear seal (19) of the valve element body (18).

\* \* \* \* \*